United States Patent [19]
Dubuit

[11] 3,901,374
[45] Aug. 26, 1975

[54] TRANSFER DEVICE FOR AUTOMATIC BOTTLE HANDLING MACHINES

[76] Inventor: Jean Louis Dubuit, 60 Rue Vitruve, Paris 20e, France

[22] Filed: Feb. 17, 1972

[21] Appl. No.: 227,560

[30] Foreign Application Priority Data
Feb. 17, 1971 France .............................. 71.05303

[52] U.S. Cl.................... 198/22 B; 198/26; 198/32; 198/279
[51] Int. Cl.[2] ......................................... B65G 47/00
[58] Field of Search...... 198/22 B, 26, 20, 32, 20 R, 198/278, 279; 141/175, 169

[56] References Cited
UNITED STATES PATENTS

| | | | |
|---|---|---|---|
| 1,243,566 | 10/1917 | Souder............................ | 141/175 X |
| 2,678,124 | 5/1954 | Bergmann............................ | 198/32 |
| 2,744,611 | 5/1956 | Jenney et al............................ | 198/32 |
| 2,753,975 | 7/1956 | Day et al. .............................. | 198/32 |
| 3,020,939 | 2/1962 | Donofrio............................ | 198/32 X |
| 3,608,697 | 9/1971 | Reinbeck........................ | 198/184 X |

*Primary Examiner*—Stanley H. Tollberg
*Assistant Examiner*—Hadd Lane
*Attorney, Agent, or Firm*—Young & Thompson

[57] ABSTRACT

A transfer device for automatic handling machines for plastic bottles. Bottles are delivered end first to a series of chutes which are offset in two sub-groups by at least the diameter of one bottle for dropping the bottles laterally offset onto a suction conveyor belt. A drop is effected after the conveyor has carried the relatively upstream sub-group of bottles from their initial position to a position in which all of the bottles of the sub-group have left the drop zone enabling a continuous flow of bottles along the conveyor belt. Guide members are provided for moving the bottles laterally to a position intermediate their initial positions, one behind another.

9 Claims, 1 Drawing Figure

PATENTED AUG 26 1975 3,901,374
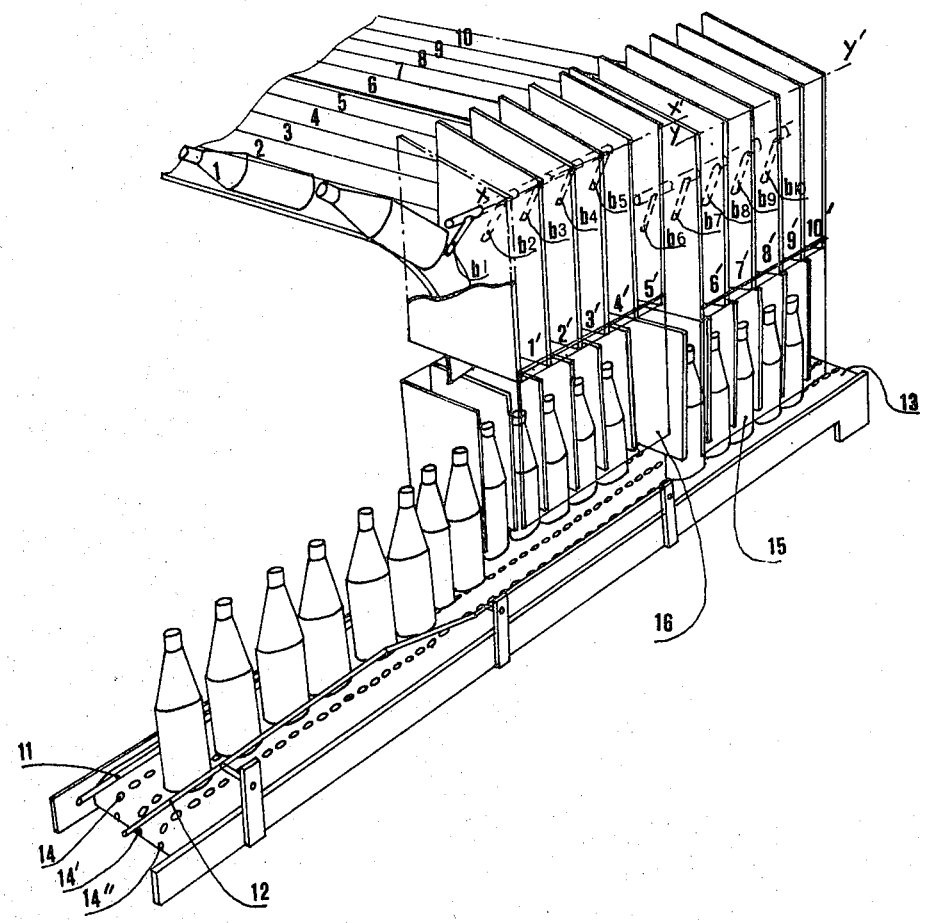

TRANSFER DEVICE FOR AUTOMATIC BOTTLE HANDLING MACHINES

The present invention concerns improvements in or relating to automatic handling machines for plastic bottles, in particular transfer devices therefor.

There already exist numerous types of transfer devices adapted to receive plastic bottles in mass coming from one or more blowing machines and to place them upright on a conveyor belt for feeding them to a bottle filling machine or a bottle printer machine.

In order to attain the throughput rates of the filling machine the transfer device must have a corresponding throughput rate, since these bottle filling machines have extremely variable production rates, ranging from 5,000–6,000 to 20,000 per hour, the transfer devices must have means enabling corresponding throughput rates to be reached. This is generally done by the selection of bottles in the channels that may be grouped in order to obtain the desired output.

Various methods enable the bottles in the channels to be received and oriented in the same direction in order to place them on the conveyor belt feeding the filling machines. This placing of the bottles on the conveyor belts is always effected by dropping the bottles from all of the channels together, onto the conveyor belt. At each drop five, 10 or 20 bottles fall to the conveyor belt.

But it is necessary to wait until the last bottle has left the drop zone before dropping another group of bottles. The dropping of the bottles takes a certain time and between a first group and a second group of bottles there is a rather substantial space along the conveyor belt along which there are no bottles which is unfavourable to the feeding of the filling machine.

Various methods have already been used to overcome similar problems, in one such method once a first group has been dropped the bottles are moved away from the drop zone, freeing the conveyor at the zone and as soon as the last bottle of the group has left the zone another drop is effected.

This method has the disadvantage of requiring the pushing of very light weight bottles on a moving conveyor belt which causes certain bottles to fall which is very prejudicial to the feeding of the filling machine.

An aim of the invention is to divide up the groups of bottles into two equal sub-groups of the same or different numbers of bottles, these two sub-groups being offset laterally or staggered so that the bottles drop directly onto a suction conveyor where they remain and by which they are driven, so that when the last bottle of the first sub-group leaves its drop zone, the drop zones for the first and second sub-groups being freed for another bottle drop. The second drop occurs while the second sub-group covers the distance corresponding to the length of the drop zone of the first sub-group. The first bottle of the next group follows immediately after the last bottle of the preceding group.

The invention will now be described with reference to the accompanying drawing in which the single figure schematically shows a perspective view of a transfer device.

The transfer device illustrated in the figure shows 10 horizontal channels 1, 2, 3 . . . 10 in which the bottles are all brought to a stop, the bottoms of the bottles leading.

It is noted that the first five channels 1–5 end along a plane passing through the line X—X' and the second five channels 6–10 end along a plane passing through the line Y—Y' which is offset forwardly about one bottle diameter from the line X—X'.

The bottles are carried on a plurality of continuously driven belts along the substantially horizontal channels which come to abut against abutments $b_1, b_2, b_3 \ldots b_{10}$. When the abutments $b_1-b_{10}$ are released or retracted by means (not shown) to drop the bottles in vertical channels $1', 2' \ldots 10'$ onto a rubber conveyor 13 with perforations or holes 14, 14', 14'' through which a strong suction is applied for stabilizing the bottles after their drop. The lower portions of the lateral partitions of the vertical channels $1'-10'$ are retractable by means (not shown) and the bottles are carried away by the conveyor onto which they are held by a strong suction.

So that the bottles have no forward movement, i.e., transverse to the belt, two plates 15 and 16 are provided which are mounted independent of the movement of the lateral partitions for limiting the channels $1'-10'$.

The bottles of the first sub-group 1–5 are maintained on the conveyor by means of suction holes 14 and displaced therealong and when the bottle no. 5 reaches the outlet end of the drop zone, the second sub-group of bottles maintained on the conveyor by means of the suction holes 14'' are in line with the channels of the first sub-group, so that the bottle no. 10 is also out of the bottle-dropping zone for the second sub-group when the bottle no. 6 is in line with the channel no. 1. When the bottle no. 10 is out of the bottle-dropping zone for the second sub-group, the drop zone for the first and second sub-groups is free and another drop may be effected during the time it takes the second sub-group to cover the distance from channel 6 to channel $1'$. After a second bottle drop has been effected, the lateral partitions are once again retracted and once the bottle no. 10 has left the drop zone for the second sub-group another sub-group of bottles nos. 1–5 follows ten bottles of the first drop without any interruption in the flow of bottles on the conveyor belt.

The two offset sub-groups leaving the drop zone are realigned along a line intermediate the two sub-groups by guiding member 11 and 12 without the slightest interruption in the flow of bottles. The realignment of the bottles along the line intermediate the two sub-groups enables the bottles to be continuously maintained upright on the conveyor by suction during their realignment owing to the series of perforations 14, 14' for the first sub-group and 14', 14'' for the second sub-group.

This device may be used upstream of a bottle filling machine or at the inlet of a bottle filling machine, a bottle printing machines or packaging machines necessitating the feeding of bottles in vertical position along a conveyor one after another. This device is useful irrespective of the shape of the bottles which may be cylindrical or conical, and oval or circular in cross section.

What I claim is:

1. A transfer device for automatic handling machines for plastic bottles, comprising a conveyor belt having a run that moves in a downstream direction, means for dropping a first subgroup of bottles onto the conveyor belt in a first relatively downstream drop zone, means for dropping a second subgroup of bottles onto the conveyor belt in a second relatively upstream drop zone, said first and second drop zones being staggered relative to each other laterally of the conveyor belt so that once the second subgroup of bottles have all left the upstream drop zone and pass opposite the relatively downstream drop zone, another drop of bottles can be effect in both drop zones in order to produce a continuous flow of bottles, and generally vertical partitions for maintaining the bottles in positionn during a drop to guide and stabilize the bottles on the conveyor after said drop, at least a portion of all the partitions being movable transverse to the direction of movement of the conveyor belt for freeing the bottles after said stabilization for movement with the conveyor belt.

2. A transfer device according to claim 1, further comprising a plurality of feed conveyor means, and an equal plurality of drop chutes adapted to be fed by said feed conveyor means, said means for dropping comprising a retractable stop disposed at the end of each feed conveyor means for controlling the dropping of bottles in the respective chutes.

3. A transfer device according to claim 1, wherein the subgroups are staggered laterally of the conveyor belt a distance at least equal to one bottle diameter.

4. A transfer device according to claim 1, further comprising guide members for laterally realigning the bottles one behind another.

5. A transfer device according to claim 4, said guide members being disposed downstream of said downstream drop zone.

6. A transfer device according to claim 1, further comprising means for laterally realigning the bottles on the conveyor belt along a line intermediate the initial positions of the subgroups thereon.

7. A transfer device according to claim 6, wherein suction orifices are provided in the conveyor belt for maintaining the bottles in upright position when they are dropped onto the conveyor belt, during and subsequent to the lateral realignment of the bottles.

8. A transfer device according to claim 7, wherein there are three rows of suction orifices corresponding to the two initial lateral positions, the two subgroups of bottles when dropped and the realigned intermediate position, respectively.

9. A transfer device according to claim 1, further comprising retainer means for preventing the movement of the bottles transverse to the movement of the conveyor belt after a drop.

* * * * *